United States Patent [19]

Coy

[11] Patent Number: 5,319,858
[45] Date of Patent: Jun. 14, 1994

[54] TOUCH PROBE

[75] Inventor: Joanne Coy, Cheltenham, United Kingdom

[73] Assignee: Renishaw plc, Gloucestershire, England

[21] Appl. No.: 778,921

[22] PCT Filed: Nov. 22, 1991

[86] PCT No.: PCT/GB91/02065

§ 371 Date: Dec. 11, 1991

§ 102(e) Date: Dec. 11, 1991

[87] PCT Pub. No.: WO92/09862

PCT Pub. Date: Jun. 11, 1992

[30] Foreign Application Priority Data

Nov. 24, 1990 [GB] United Kingdom ............... 9025585
May 3, 1991 [GB] United Kingdom ............... 9109676

[51] Int. Cl.$^5$ .............................................. G01B 5/03
[52] U.S. Cl. ...................................... 33/561; 33/558
[58] Field of Search .................... 33/558, 561; 200/270

[56] References Cited

U.S. PATENT DOCUMENTS

| 1,155,427 | 10/1915 | Liebmann et al. | 200/270 |
|---|---|---|---|
| 1,220,886 | 3/1917 | Pfanstiehl | 200/270 |
| 1,395,269 | 11/1921 | Gebauer | 200/270 |
| 2,294,783 | 9/1942 | Ely | 200/270 |
| 2,914,640 | 11/1959 | Grattidge | 200/270 |
| 3,106,628 | 10/1963 | Chiswell | 200/270 |
| 3,254,189 | 5/1966 | Evanicsko et al. | 200/270 |
| 4,451,987 | 6/1984 | Cusack | 33/561 |
| 4,815,214 | 3/1989 | Enderle et al. | 33/832 |

FOREIGN PATENT DOCUMENTS

| 658742 | 3/1963 | Canada ................ 200/270 |
| 0254903A3 | 2/1988 | European Pat. Off. . |
| 1100833 | 3/1961 | Fed. Rep. of Germany . |
| 2441713 | 11/1976 | Fed. Rep. of Germany . |
| 3431476A1 | 7/1985 | Fed. Rep. of Germany . |
| 57-192263 | 11/1982 | Japan . |
| 539846 | 9/1941 | United Kingdom ................ 200/270 |
| 874457 | 8/1961 | United Kingdom . |
| 1544841 | 4/1979 | United Kingdom . |
| 2070249A | 9/1981 | United Kingdom . |
| 2145523A | 3/1985 | United Kingdom . |

Primary Examiner—Thomas B. Will
Attorney, Agent, or Firm—Oliff & Berridge

[57] ABSTRACT

A touch probe comprises a stylus-supporting member kinematically supported with respect to a housing at six points of contact between the stylus-supporting member and the housing. At each of these points of contact a conducting surface on the stylus-supporting member abuts a conducting surface on the housing. Each of the contacts are included in an electrical circuit. The conducting material of each of the conducting surfaces comprises a material having a resistivity of less than 8 $\mu\Omega$cm and a melting voltage of at least 0.7 volts. A material having these properties is less susceptible to physical degradation than prior art materials used in such a probe. In a preferred embodiment the conducting material of each of the conducting surfaces is made of pure tungsten.

8 Claims, 5 Drawing Sheets

TOUCH PROBE

BACKGROUND OF THE INVENTION

1. Field of the Invention

The present invention relates to a touch probe, used on a coordinate positioning machine to determine contact between a stylus and a surface. In particular, the invention relates to an electro-mechanical contact used in such a probe, and to materials used to form such a contact.

2. Discussion of the Related Art

Existing known touch probes provide a fixed structure by which the probe is supported on the movable arm of the machine on which the probe is to be used, and a stylus supporting member supported on the fixed structure at a number of locations in a mechanically repeatable rest position, out of which the stylus-supporting member may be deflected when a deflecting force is applied thereto, and to which it may return when the force is removed. At each of these locations, a surface provided on the stylus-supporting member abuts a corresponding surface provided on the fixed structure. Contact between a stylus carried b the stylus-supporting member and a surface whose position is to be measured causes movement of the stylus-supporting member out of the rest position. Such contact may thus be determined by examining the electrical resistance of the contacts between corresponding surfaces on the fixed structure and stylus-supporting member. These contacts are known as electro-mechanical contacts. Probe which employ electro-mechanical contacts are known, and are described for example in U.S. Pat. No. 4,153,998.

The basic requirements for an electro-mechanical contact in such probes are best illustrated with reference to FIG. 1 of the accompanying drawings, which shows a conducting sphere 10 resting on a conducting plane surface 12, and an electrical circuit 14 of which the sphere 10 and the plane surface 12 form a part. One requirement of an electro-mechanical contact is that the sphere 10 may be removed and replaced repeatedly upon the surface 12, and that both before and after a cycle of removing and replacing the sphere 10 on the surface 12, the center O of the sphere 10 should lie at a distance h above the surface 12. This requirement is known as mechanical repeatability i.e. that the mechanical relationship between the sphere 10 and the surface 12 is repeatable (in respect of the distance h) over a large number of cycles of breaking and re-seating of the mechanical contact. Another requirement of an electro-mechanical contact relates to the changes in electrical resistance which occur in the circuit 14 as a result of breaking and re-seating of the contact. More specifically, it is a requirement that the characteristic changes in resistance which occur during a breaking and re-seating cycle are the same over a large number of cycles, such that during breaking of the contact, a given value of resistance repeatedly corresponds to a given distance of the center O of the sphere 10 from the surface 12. This is known as electrical repeatability.

In the above described probe, electronic detection circuitry associated with the probe emits a trigger signal when the resistance of a pair of contacting surfaces reaches a pre-determined threshold (the probe is thus sometimes known as a touch-trigger probe). Emission of this trigger signal indicates contact between a stylus supported by the probe and a workpiece whose surface is to be measured. (N. B. the signal is sent to the control of the machine, and is used by the machine to determine the position of the movable arm and thus the position of the surface). Similarly, a reduction in the value of resistance of the contact to a resistance value below the pre-determined threshold indicates that the stylus supporting member has returned to its rest position with respect to the fixed structure (which is essential for a probe of this type).

The choice of a material for an electro-mechanical contact in a touch trigger probe has in the past been governed by the perceived requirements for the material to have the maximum possible hardness with a smooth surface finish, while simultaneously being a conducting material. The hardness and surface finish requirements were chosen to provide good mechanical repeatability of the stylus-supporting member (the smooth surface finish aiding this by reducing friction), and resistance to physical damage of the contacts, thus prolonging the useful life of the probe. Known such touch-trigger probes employ tungsten carbide having a cobalt binder. In order to prevent oxidation of the contacts during operation, the contacts are coated in oil.

A long standing problem with known touch-trigger probes, which occurs after a relatively large number of unseating and re-seating cycles of the stylus supporting member with respect to the fixed structure, is that the resistance of one or more of the contacts fails to drop below the predetermined threshold which signals re-seating of the stylus supporting member in the fixed structure. This phenomenon is known as "re-seat failure".

It has been postulated that this failure to re-seat is a mechanical phenomenon due to friction at one or more of the contacts, acting to prevent re-seating of one or more of the other contacts. In an effort to overcome this perceived problem, methods of operating the machine on which the probe in question was used have been proposed which effectively "tap" the stylus supporting member to attempt to cause it to return to its rest position (see e.g. GB 2070249 and U.S. 4815214). A further mechanical reason advanced for re-seat failure suggested that a small scale mechanical shift between the contact surfaces, from one cycle of unseating and re-seating to another, led to a change in the material providing the contact area between the contact surfaces. For example such a mechanical "shift" might result in the material of the contact area of one of the surfaces changing from being provided by the binder material of the tungsten carbide, to a "carbide particle", with a consequential change in resistance (see for example GB 2145523).

GB 2145523 also postulates that a re-seat failure is sometimes the result of oxidation layers forming over the tungsten carbide contacts during the operating life of the probe.

The disclosure of GB 2145523 proposes, as a solution to both perceived problems (i.e. mechanical shift of the contact surfaces and generation of an oxidation layer), the coating of the contact surfaces with a coating of titanium carbide or titanium nitride. Such coatings were thought to provide improved mechanical repeatability due to the higher hardness of the coating material, while the electrical resistance characteristics of the contacts were thought to be improved by an apparent homogeneity of the coating material.

None of the above prior art solutions have been found to be satisfactory. Methods providing mechanical disturbance to the contacts, while they overcome some individual instances of re-seat failure, have not provided a solution which prevents such a re-seat failure in the first place. Attempts to cure the perceived problem of oxidation by coating the contact surfaces with oil have also failed to solve the problem of the re-seat failure. We have found titanium nitride or titanium carbide coatings to be unsatisfactory because they provide poor mechanical repeatability, the resistivity of the coating is too high, and the coatings have a tendency to flake off during operation of the probe.

SUMMARY OF THE INVENTION

A first aspect of the present invention lies in the discovery of the reason behind the re-seat failure of an electro-mechanical contact of tungsten carbide surfaces in a touch probe, and in particular, that re-seat failure is a result of contact surface degradation caused by electrical, rather than mechanical phenomenon. We have discovered that "re-seat failure" results from a depletion of conductive binder material (i.e. cobalt or nickel) of the tungsten carbide used in the contact surfaces over the area of the contact patches of such surfaces. The cobalt depletion occurs because it is a soft material with a consequential low melting voltage, and is therefore easily dispersed from the contact patch area by the passage of current through the contacts. The depletion of cobalt over the area of the contact patches results in an increased resistance; this thus accounts in part for the failure of the resistance of the contacts to fall below the pre-determined threshold level after a large number of unseating and re-seating cycles. We have further discovered that the problem is exacerbated by the use of certain lubricating oils. Due to the generation of excessive heat at the contact surfaces, as a result of the increased resistance due to the cobalt depletion, deposits from the lubricating oils (used in such probes to prevent oxidation of the contact surfaces) appear on the contact surfaces, further increasing the resistance of the contacts. Deposits from the lubricating oils currently used in such probes have been found to be carboniferous deposits.

The present invention provides a touch probe having: a fixed structure by which the probe may be connected to the movable arm of a coordinate positioning machine; a stylus supporting member for supporting a stylus, the stylus-supporting member being supported in a mechanically repeatable rest position with respect to a fixed structure, and being movable from said rest position responsive to a deflecting force, and returnable to said rest position when said force is removed; wherein said stylus supporting member is supported on the fixed structure at at least three locations by contact between a surface provided on the supporting member with a surface provided on the fixed structure, wherein each of said surfaces is made of a material which includes a conductive material having a resistivity of less than 8 $\mu\Omega$cm and a melting voltage of at least 0.7 volts.

By using a material having the above-mentioned properties, both the dispersion of conductive material from the contacts, and the extent to which deposits from the breakdown of lubricating oil appear on the contacts are reduced.

Preferably, the contact surfaces will be made of a homogenous material. In a preferred embodiment the material of the contact surfaces will have a resistivity of less than 6 $\mu\Omega$cm.

Preferably, the contact surfaces will be made of tungsten, and more preferably, the contacts will be made of substantially pure tungsten (i.e. having a purity of 95% or greater).

BRIEF DESCRIPTION OF THE DRAWINGS

Embodiments of the invention will now be described, by way of example, and with reference to the accompanying drawings in which.

DESCRIPTION OF THE PREFERRED EMBODIMENT

Figure 1:
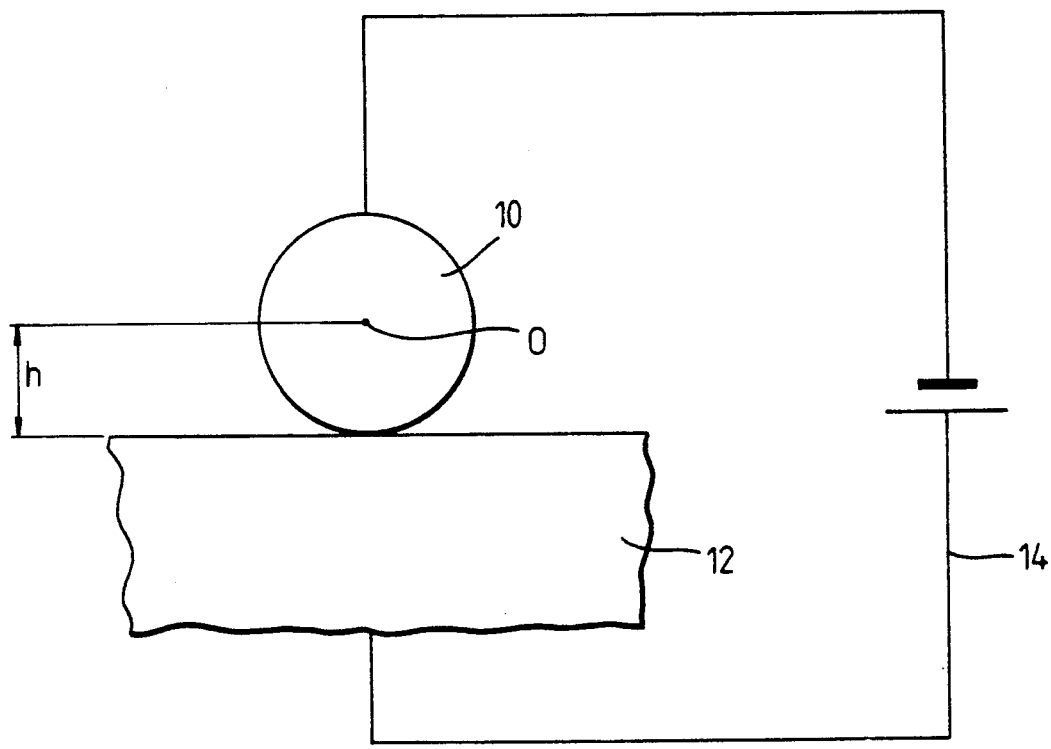
FIG. 1 portrays the basic requirements for an electro-mechanical contact used in a touch probe.
Figure 2:
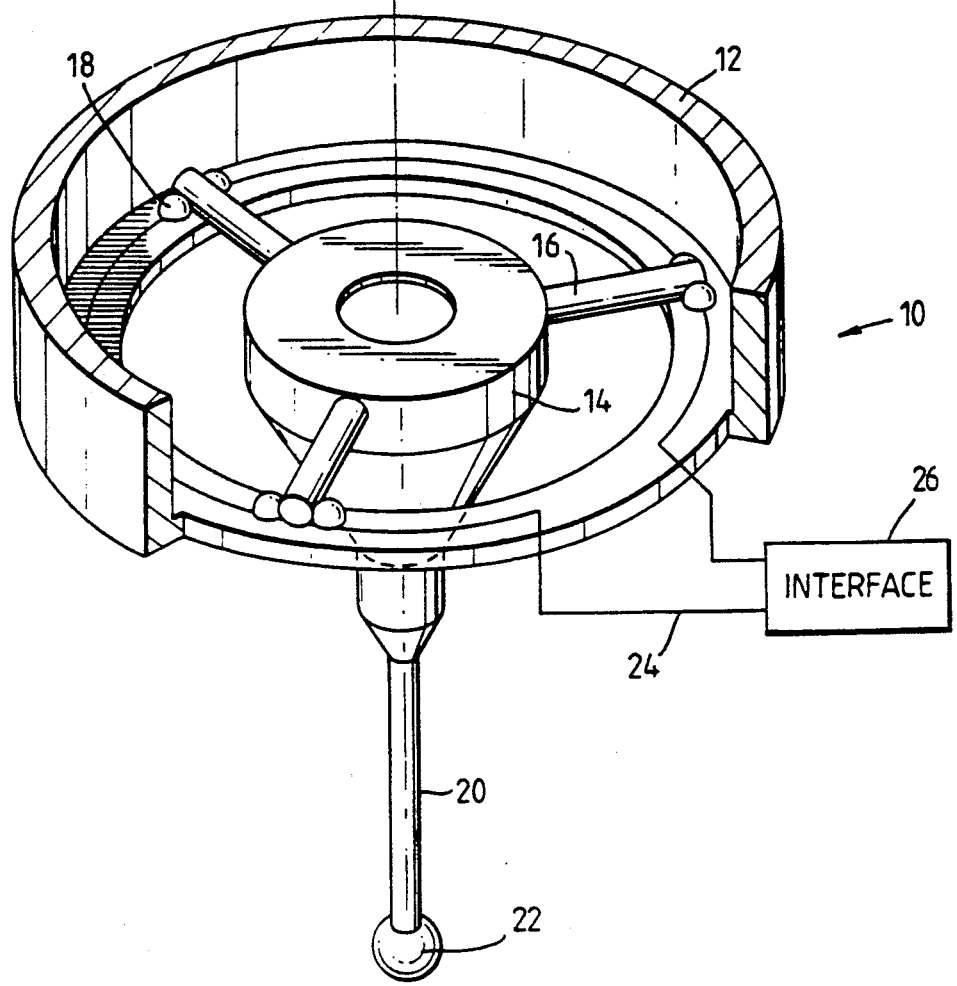
FIG. 2 shows an embodiment of a touch probe according to the present invention.

Referring now to FIG. 2, a probe 10 comprises a fixed structure provided by a cylindrical housing 12, by which the probe 10 may be fixedly connected to the movable arm of a coordinate positioning machine. A stylus supporting member 14 is kinematically supported at six points of contact in a rest position with respect to the housing 12, by three cylindrical rollers 16, each of which rests upon the convergent surfaces provided by an adjacent pair of balls 18. The balls 18 are supported at the base of the housing 12. A stylus 20 is supported by the stylus supporting member 14, and has a spherical sensing tip 22 which, in operation, contacts a workpiece surface. The stylus supporting member 14 is urged into its rest position by a spring (not shown). A kinematic rest position for the stylus-supporting member 14 is preferred because to measure accurately, the measuring tip 22 of the stylus 20 must, after each deflection, return to its previous position relative to the housing 12 typically to within about 200 nanometres. In one practical example of the probe described above, the rollers 16 have a diameter of 1.5 mm, the balls 18 have a diameter of 2 mm, and the spring force on the stylus-supporting member is 0.5N. In use on a machine, an electrical circuit 24, comprising the serial connection of each of the contacts between a roller 16 and ball 18, and an interface 26 are provided for generating a trigger signal indicating contact between the sensing tip 22 and the workpiece surface. The interface 26 outputs a trigger signal when the voltage across one or more of the contacts reaches a predetermined threshold $V_t$, due to an increase in resistance across the contact, or contacts in question.

Figure 3:
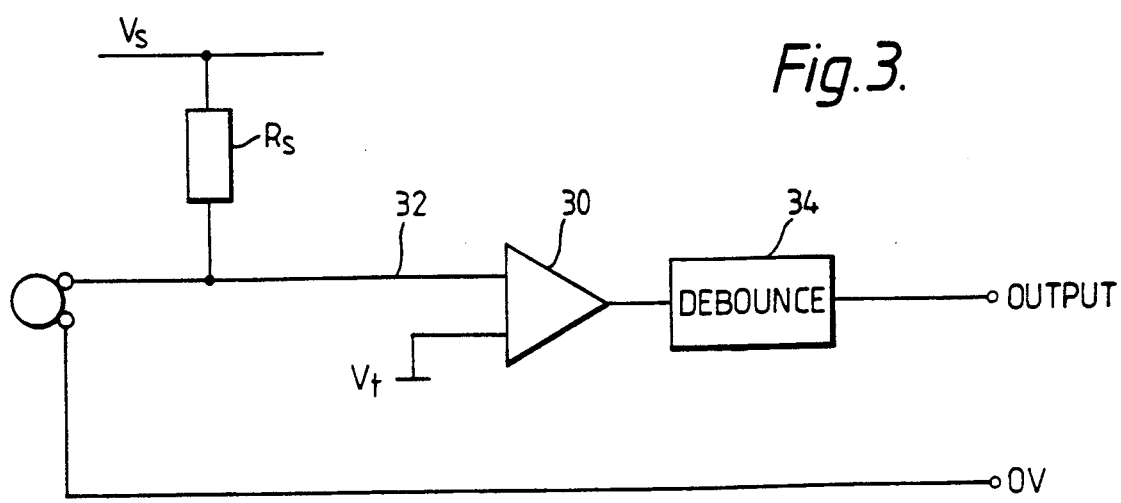
FIG. 3 shows detection circuitry used with the probe of FIG. 2.

Referring to FIG. 3, the interface 26 provides a supply voltage $V_s$ to the circuit 24 via a resistor $R_s$, which limits the current through circuit 24. A threshold comparator 30 emits a signal when the voltage on line 32 exceeds a predetermined threshold $V_t$, and a debounce circuit 34 "cleans up" the output signal of comparator 30. The debounce circuit 34 produces a high signal output (which is the trigger signal) when the output of the comparator 30 first goes high; this debounce output signal only goes low at a predetermined time interval after the last high signal of comparator 30. For the probe described above, the supply voltage $V_s$ in the interface 26 is 12 volts, the value of resistor $R_s$ is approximately 22 K$\Omega$, and the current through the circuit 24 is thus approximately 550 $\mu$A; the threshold voltage $V_t$ is approximately 1.5 volts. We have found that with a supply voltage of substantially less than 12 volts, re-seat failure tends to increase.

The requirements for the material from which the contact surfaces of the balls 18 and rollers 16 are made are complex. Firstly, the surfaces should contain a conducting material which has a high melting voltage, preferably at least 0.7 volts, and more preferably greater than 1 volt. This reduces the susceptibility to dispersion from the contact patch area of the conducting material in the surface, caused by the passage of current between the contacts, and the repeated voltage rise across the contacts during triggering. Secondly, the resistivity of the conducting material in the contact surfaces should be less than 8 $\mu\Omega$cm, and more preferably less than 6 $\mu\Omega$cm. Contact surfaces which contain conducting material within this resistivity range have a relatively low maximum resistance at which the surfaces are still in contact; this reduces the possibility of lubricant breakdown and the resultant contamination of the contact patch area by e.g. carboniferous deposits.

Preferably the surfaces are made of a physically homogenous material, and preferably a single-phase homogeneous material. These requirements are beneficial both electrically and mechanically. From an electrical viewpoint, the overall resistance of the contact is reduced yet further if the entire contact patch area is made of the conducting material described above. Mechanically, we believe that with materials above a certain Vickers hardness, friction is governed primarily by the regularity of the lattice planes; regular lattice planes enable easier sliding of the surfaces. A single phase, (i.e. "pure") homogenous substance will have a more regular lattice structure compared with the surface of a material with a secondary phase (e.g. "carbide" in tungsten carbide, or "nitride" in titanium nitride).

In a preferred embodiment, the rollers 16 and balls 18 are manufactured of substantially pure (i.e. 95% by weight or greater) drawn wire tungsten. Such tungsten has a Vickers hardness of about 1000, a melting voltage of about 1.1 volts, and a resistivity of 5.5 $\mu\Omega$cm.

However, we believe that other substances whose melting voltage exceeds 0.7 volts, and whose resistivity is less than 8 $\mu\Omega$cm will produce results which improve upon existing tungsten carbide. For example, a suitable composite material containing molybdenum could be used. (Molybdenum has a melting voltage of 0.75 volts, a resistivity of about 5 $\mu\Omega$cm and a Vickers hardness of 250.) Where the material is not homogenous, and is instead a composite material, the grain size of the material should be small in comparison with the size of the contact patch area. Preferably the grain size should be 1 $\mu$m$^2$ or less, and more preferably 0.25 $\mu$m$^2$ or less. (N. B. The size of the contact patch area is determined by the dimensions of the balls and rollers and the spring force. In the above example the contact patch approximates roughly to a circle of diameter 200 $\mu$m).

The surfaces of the rollers 16 and balls 18 should be cleaned prior to assembly with an anti-oxidation agent to remove all oxidation layers and other impurities from the surface of the component. Once assembled, the surfaces should be coated in oil to prevent subsequent oxidation. Any oxidation layer formed prior to this operation may be mechanically disrupted before operation of the probe. Subsequent oxidation is avoided by the use of oil. The oil should preferably be an oil which does not deposit carboniferous or other substances over the contact surfaces.

Figure 4:
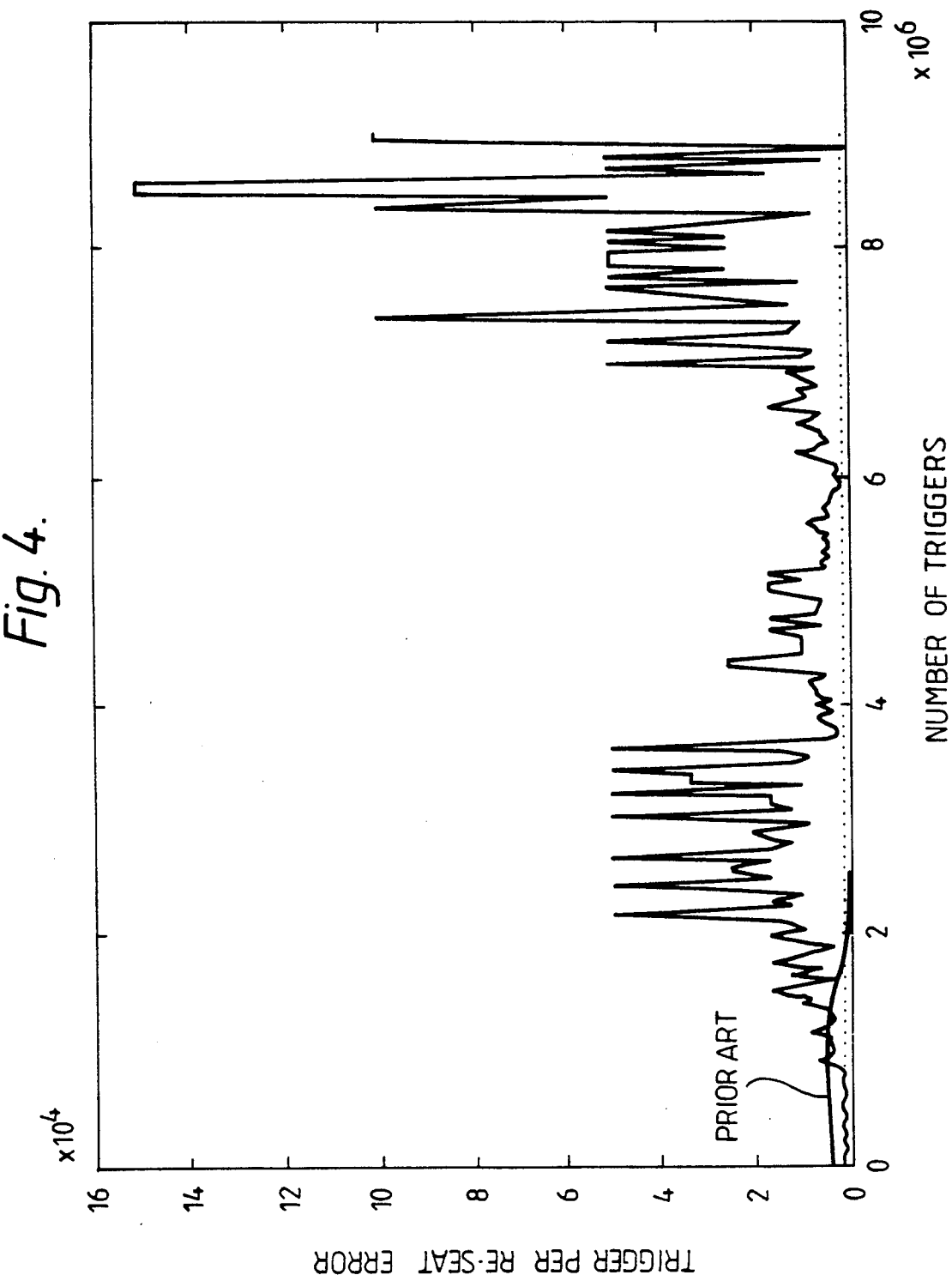
FIG. 4 is a graph showing the performance of a touch probe according to the present invention.

Referring now to FIG. 4, the re-seat performance of a probe having tungsten rollers 16 and balls 18 is illustrated in comparison with a prior art probe of the same type (i.e. same spring force, the same dimension of components) and using the same (prior art) lubricating oil. The number of triggers indicating stylus-workpiece contact per re-seat failure (i.e. the number of "un-seat - re-seat" cycles per "un-seat - re-seat failure" cycle) is plotted against the total number of triggers. Data in this graph was taken every $5 \times 10^4$ triggers; i.e. the number of re-seat errors in each sample $5 \times 10^4$ triggers is counted, and the data point is the product of dividing $5 \times 10^4$ by the said number. From the graph it can be seen that the prior art probe maintains a re-seat performance of over 1000 triggers per re-seat failure for a life of approximately 1.5 million triggers. In comparison, the probe of the present invention maintains a performance level in excess of this for about 9 million triggers. The "peak and trough" characteristics of the graph we believe are the result of a number of factors. Firstly, the plotting of data points every $5 \times 10^4$ triggers results in sharper undulations than if points were plotted, for example, every $1 \times 10^5$ triggers Secondly, to obtain a true comparison with a prior art probe, the prior art lubricant was used to coat the surfaces of the tungsten rollers 16 and balls 18. A result of this is the periodic build-up and disruption of carboniferous and other deposits over the contact surfaces resulting, periodically, in relatively high numbers of re-seat failures. Finally, examination of a probe after 9 million triggers revealed that the performance of certain components in the probe, such as the spring which urges the stylus-supporting member into its rest position, was found to have deteriorated (this is not surprising since prior art probes were not designed for an operating life of 9 million triggers). A consequent reduction in the spring force is believed to be a contributory factor to the variable re-seat performance of the sample probe after about 4 million triggers.

Upon examination of the contacts of a probe with tungsten rollers 16 and balls 18 after over 4 million triggers, no indication of physical damage to the contact patches was found. In contrast, the contact patches of a prior art probe were found to be pitted (due to dispersion of cobalt) after 1.5 million triggers.

Figure 5A:
FIGS. 5A and 5B are electron micrographs of prior art electrical contact surfaces.
Figure 5B:
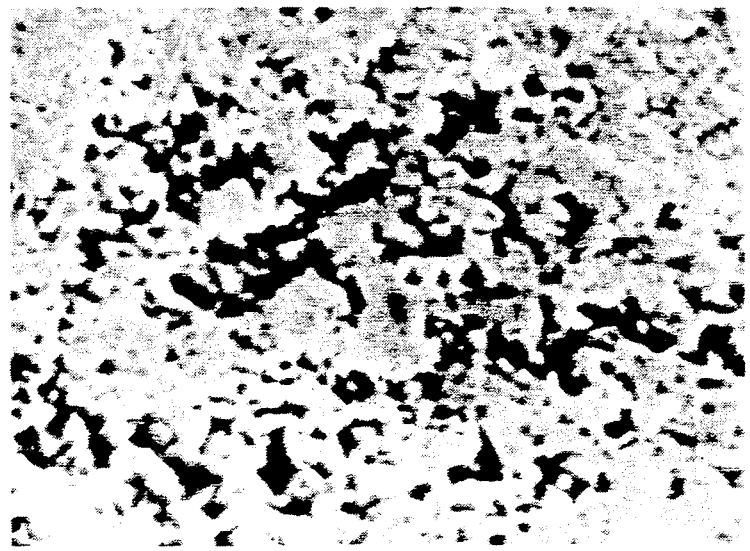

Referring now to FIGS. 5A and B, the surface of a prior art ball contact is shown in an electron micrograph. FIG. 5A shows a large area of the surface, and the contact patch at the center of the picture distinguishable by an area of black speckles. These speckles are the areas from which the conductive cobalt binder of the tungsten carbide has been dispersed. Such a contact patch area is shown in more detail in the more magnified micrograph of FIG. 5B, where pitting of the surface as a result of cobalt dispersion can be clearly seen as the dark patches in the micrograph.

Figure 6A:
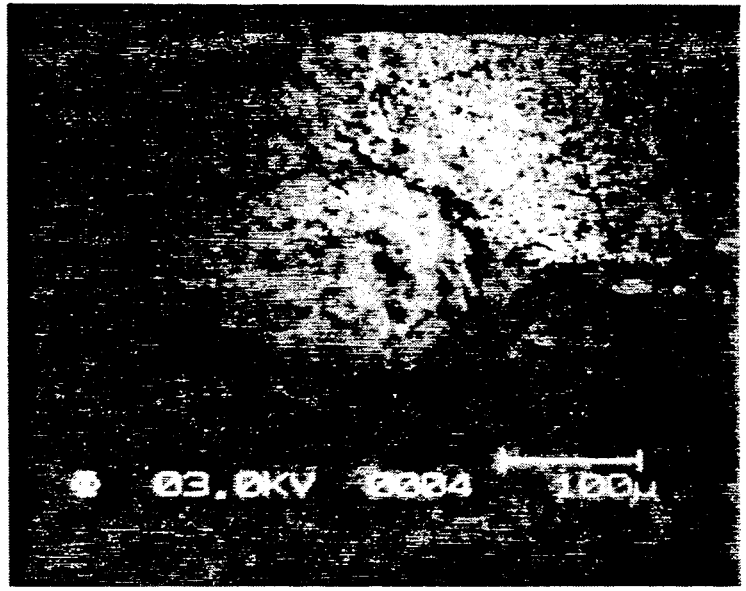
FIGS. 6A and 6B are electron micrographs of electrical contacts according to the present invention.
Figure 6B:
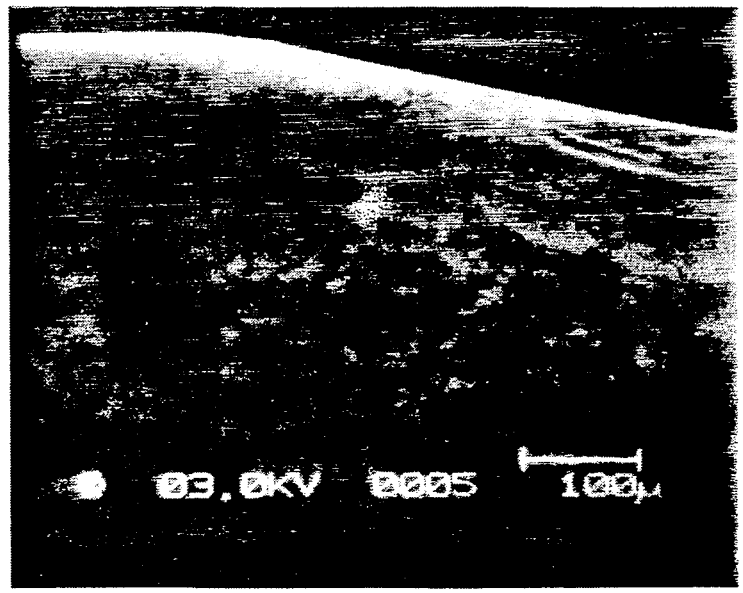

FIGS. 6A and B are electron micrographs of tungsten ball and roller contact patches respectively, taken after over 4 million triggers. Referring now to FIG. 6A, the contact patch is recognizable as the lighter, roughly ellipsoidal area in the center of the picture It can be seen from this figure that although there has been substantial disruption of the oxide layer and other chemical contaminants from the area of the contact patch, there is no visible physical damage to the area of the contact patch (unlike tungsten carbide). The chemical disruption referred to above can be seen from the lighter tone of the contact patch, and has been confirmed by Auger electron spectroscopy. Referring now to FIG. 6B, the contact patch of a tungsten roller can be seen as the blotchy ellipsoidal area at the center of the electron micrograph. These dark blotches were investigated by Auger electron spectroscopy and found to consist mainly of carbon. As mentioned above, we believe that these deposits result from the use of a prior art lubricating oil which breaks down due to the heat generated at the contacts (and will thus be avoided altogether by using the oil referred to above). However, no physical damage to the contact patch area has been detected. (N. B. the indentation at the top right-hand side of the picture is a production defect and not the result of probe operation).

This completely contradicts prior art thinking. It has previously been thought that hardness of the material and surface finish were the major factors in determining the extent of physical damage to the contacts; hence the choice of tungsten carbide. We have found this to be incorrect, since tungsten has a Vickers hardness of 1000 compared with a value of about 1500 for tungsten carbide, and the surface finish achievable with tungsten cannot match that of tungsten carbide. We believe the superior resistance to damage of tungsten may be explained as follows. Firstly, the physical degradation of the tungsten carbide contact patches is the result of what is primarily an electrical phenomenon which does not affect tungsten. Thus, to the extent that this electrical phenomenon governs physical damage to the contacts, Vickers hardness or surface finish are not important. Secondly, (and as a second order effect) we believe that the reduced friction (discussed above) between tungsten contact surfaces when compared with tungsten carbide surfaces is also a factor.

To determine whether the completion of a large number of triggers affected the measuring capability of the probe, the repeatability of the probe of FIG. 4 was investigated before re-seat testing, and after the probe had performed 9 million triggers. The repeatability of a probe in performing a measurement of the position of a feature is its ability, over a large number of measurements, to consistently cause the interface to emit a trigger signal at the same relative position of the probe and feature. Good repeatability is thus a pre-requisite for an accurate probe, and useful probe life is therefore determined by the number of triggers the probe can perform while maintaining both an acceptable re-seat performance and the requisite repeatability.

Tables 1 and 2 show the results of repeatability tests performed before the probe of FIG. 4 started its re-seat test and after 9 million triggers respectively. Each of the six columns of numbers are values (in microns) of the position of the probe relative to the feature against which the probe was calibrated. Each column contains at least one reading whose value is 0.00, and this is the reference value to which all other values are compared. For example, a probe trigger at a reading of 0.37 indicates that the relative position of probe and feature at this trigger differed by 0.37 microns to their relative position at the "reference" trigger (value 0.00). Similarly, a column of figures which all have the value 0.00 indicates that the probe and feature were in the same relative position at each trigger. The six different columns each contain values obtained by probing in only one of six different directions, all of which are radial with respect to the length of the stylus, and are spaced at 60° intervals.

The repeatability (the "$2\sigma$ value") for each probing direction is twice the standard deviation on the values in the relevant column. The six $2\sigma$ values are combined to give a mean repeatability ("2e value"), the lower the 2e value, the better the repeatability of the probe.

TABLE 1

| No. | 000 | 060 | 120 | 180 | 240 | 300 |
| --- | --- | --- | --- | --- | --- | --- |
| 1 | 0.00 | 0.10 | 0.15 | 0.11 | 0.32 | 0.54 |
| 2 | 0.03 | 0.27 | 0.00 | 0.09 | 0.25 | 0.35 |
| 3 | 0.02 | 0.17 | 0.21 | 0.00 | 0.01 | 0.06 |
| 4 | 0.03 | 0.00 | 0.01 | 0.09 | 0.01 | 0.00 |
| 5 | 0.05 | 0.06 | 0.01 | 0.10 | 0.00 | 0.58 |
| 6 | 0.05 | 0.07 | 0.00 | 0.09 | 0.02 | 0.41 |
| 7 | 0.07 | 0.06 | 0.00 | 0.06 | 0.02 | 0.40 |
| 8 | 0.07 | 0.05 | 0.02 | 0.06 | 0.02 | 0.36 |
| 9 | 0.12 | 0.04 | 0.00 | 0.07 | 0.03 | 0.54 |
| 10 | 0.09 | 0.05 | 0.01 | 0.08 | 0.02 | 0.54 |
| $2\sigma$ | 0.07 | 0.15 | 0.14 | 0.06 | 0.22 | 0.38 |

2e value 0.27

TABLE 2

| No. | 000 | 060 | 120 | 180 | 240 | 300 |
| --- | --- | --- | --- | --- | --- | --- |
| 1 | 0.20 | 0.39 | 0.01 | 0.20 | 0.01 | 0.02 |
| 2 | 0.16 | 0.00 | 0.00 | 0.00 | 0.13 | 0.02 |
| 3 | 0.13 | 0.13 | 0.00 | 0.08 | 0.06 | 0.01 |
| 4 | 0.26 | 0.28 | 0.20 | 0.17 | 0.05 | 0.02 |
| 5 | 0.24 | 0.20 | 0.19 | 0.21 | 0.08 | 0.00 |
| 6 | 0.38 | 0.02 | 0.29 | 0.04 | 0.10 | 0.02 |
| 7 | 0.21 | 0.07 | 0.14 | 0.24 | 0.00 | 0.01 |
| 8 | 0.23 | 0.23 | 0.06 | 0.23 | 0.14 | 0.00 |
| 9 | 0.00 | 0.09 | 0.09 | 0.16 | 0.14 | 0.02 |
| 10 | 0.02 | 0.14 | 0.01 | 0.15 | 0.13 | 0.03 |
| $2\sigma$ | 0.27 | 0.23 | 0.19 | 0.15 | 0.10 | 0.02 |

2e value 0.24

It can be seen from the difference in 2e value (0.27 microns before testing, compared with 0.24 microns after 9 million triggers) that there has been no measurable degradation of the probe after 9 million triggers.

Since probe repeatability is dependent upon both mechanical and electrical repeatability at each of the contacts, these results support our belief that there is no physical damage at the contacts, and that with the magnitude of forces involved, physical damage is governed primarily by electrical phenomenon for materials above a certain hardness.

It is not essential for the stylus-supporting member to be kinematically supported, provided it is supported in a rest position which is sufficiently mechanically repeatable to measure within the required limits of accuracy. Further, any suitable form of kinematic support such as those disclosed in U.S. Pat. No. 4,153,998 or U.S. Pat. No. 4,301,338 may be used.

What I claim is:

1. A touch probe having:
   a fixed structure by which the probe may be connected to the movable arm of a coordinate positioning machine;
   a stylus supporting member for supporting a stylus, the stylus-supporting member being supported in a mechanically repeatable rest position with respect to said fixed structure, from which position the supporting member may be displaced when a deflecting force is applied thereto and to which it may return when said deflecting force is removed, wherein said stylus supporting member is supported on the fixed structure at at least three locations by contact between a surface provided on the supporting member with a surface provided on the fixed structure, wherein each of said surfaces includes a conductive material having a resistivity of less than 8 $\mu\Omega$cm and a melting voltage of at least 0.7 volts.

2. A touch probe according to claim 1 wherein said conductive material has a melting voltage of 1 or greater.

3. A touch probe according to claim 1 wherein said conducting material has a resistivity of 6 $\mu\Omega$cm or less.

4. A touch probe according to claim 1 wherein said surfaces consist entirely of said conductive material.

5. A touch probe according to claim 1, in combination with an electrical circuit, said circuit incorporating the serial connection of said contact surfaces, and being adapted to output a trigger signal when the resistance across at least one pair of said contact surfaces reaches a predetermined threshold.

6. A touch probe, comprising:
a fixed structure by which the probe may be connected to the movable arm of a coordinate positioning machine;
a stylus supporting member for supporting a stylus, the stylus-supporting member being supported in a mechanically repeatable rest position with respect to said fixed structure, from which position the supporting member may be displaced when a deflecting force is applied thereto and to which it may return when said deflecting force is removed, said stylus supporting member being supported on the fixed structure at at least three locations by contact between a surface provided on the supporting member with a surface provided on the fixed structure, wherein said surfaces are made of substantially pure tungsten.

7. A touch probe having:
a fixed structure by which the probe may be connected to the movable arm of a coordinate positioning machine;
a stylus supporting member for supporting a stylus, the stylus-supporting member being supported in a mechanically repeatable rest position with respect to said fixed structure, from which position the supporting member may be displaced when a deflecting force is applied thereto and to which it may return when said deflecting force is removed, wherein said stylus supporting member is supported on the fixed structure at at least three locations by contact between a surface provided on the supporting member with a surface provided on the fixed structure, wherein each of said surfaces is made of a composite material which contains a conductive substance having a resistivity of less than 8 $\mu\Omega$cm and a melting voltage of at least 0.7 volts, said composite material having a grain size less than 1 $\mu m^2$.

8. A touch probe according to claim 7 wherein the grain size is 0.25 $\mu m^2$ or less.

* * * * *